(12) United States Patent
Funahara et al.

(10) Patent No.: US 9,162,408 B2
(45) Date of Patent: Oct. 20, 2015

(54) TIRE FOR MOTORCYCLE AND METHOD OF MANUFACTURING THE SAME

(75) Inventors: Kiyoshi Funahara, Kobe (JP); Toyoto Taniguchi, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 1114 days.

(21) Appl. No.: 12/671,173

(22) PCT Filed: Aug. 7, 2008

(86) PCT No.: PCT/JP2008/002148
§ 371 (c)(1),
(2), (4) Date: Jan. 28, 2010

(87) PCT Pub. No.: WO2009/025072
PCT Pub. Date: Feb. 26, 2009

(65) Prior Publication Data
US 2010/0200132 A1 Aug. 12, 2010

(30) Foreign Application Priority Data
Aug. 22, 2007 (JP) ................................ 2007-215357

(51) Int. Cl.
*B29D 30/60* (2006.01)
*B60C 11/00* (2006.01)
*B29D 30/16* (2006.01)

(52) U.S. Cl.
CPC ............ *B29D 30/60* (2013.01); *B29D 30/1628* (2013.01); *B60C 11/0058* (2013.04); *B60C 11/0041* (2013.04); *B60C 2011/0025* (2013.04); *B60C 2200/10* (2013.04)

(58) Field of Classification Search
CPC .................. B60C 11/0058; B60C 2011/0025; B60C 11/0041; B29D 30/60
USPC .................... 156/117, 130; 152/209.5, 209.11
See application file for complete search history.

(56) References Cited

U.S. PATENT DOCUMENTS

| | | | |
|---|---|---|---|
| 2006/0102266 A1* | 5/2006 | Ravasio et al. | 152/209.5 |
| 2007/0102083 A1* | 5/2007 | Hayashi | 152/209.5 |
| 2007/0137747 A1* | 6/2007 | Yoshida | 152/209.5 |

FOREIGN PATENT DOCUMENTS

| | | | |
|---|---|---|---|
| JP | 10-119513 A | * | 5/1998 |
| JP | 2005-271760 A | | 10/2005 |

(Continued)

OTHER PUBLICATIONS

Machine translation for Korea 2003-0025966 (no date).*

(Continued)

*Primary Examiner* — Steven D Maki
(74) *Attorney, Agent, or Firm* — Birch Stewart Kolasch & Birch, LLP

(57) ABSTRACT

It is an object to provide a tire for a motorcycle which does not damage a stability in a transition between straight running and cornering but is excellent in various performances. A tire (2) includes a tread (4). The tread (4) is divided into (2N−1) parts (N is a natural number which is equal to or greater than four). The tread (4) is divided into a first region (20) positioned on a center region and a second region (22) to an Nth region in order from the center region toward a shoulder region. The second region (22) to the Nth region make a pair of regions which are symmetrical with respect to an equator plane of the tire. The first region (20) to the Nth region are formed by crosslinked rubber compositions respectively and materials of the respective regions are different from each other. In the first region (20) to the Nth region, a rubber hardness of the region on the adjacent center side is equal to or higher than a rubber hardness of the region on the shoulder side. A rubber hardness of the first region (20) is set to be higher than a rubber hardness of the Nth region.

8 Claims, 3 Drawing Sheets

(56) References Cited

FOREIGN PATENT DOCUMENTS

| JP | 2007-131112 A | | 5/2007 |
|----|---------------|---|--------|
| JP | 2007-168531 A | | 7/2007 |
| KR | 2003-0025966 A | * | 3/2003 |

OTHER PUBLICATIONS

Machine translation for Japan 10-119513 (no date).*
Derwent abstract for Korea 2003-025966 (no date).*

* cited by examiner

TIRE FOR MOTORCYCLE AND METHOD OF MANUFACTURING THE SAME

TECHNICAL FIELD

The present invention relates to a pneumatic tire to be attached to a motorcycle. In more detail, the present invention relates to an improvement in a tread of a tire.

BACKGROUND ART

In cornering of a motorcycle, a centrifugal force acts on the motorcycle. For the cornering, it is necessary to apply a cornering force. The cornering force is balanced with the centrifugal force. In the cornering, a rider tilts the motorcycle inward. By a camber thrust generated by the tilt, the cornering can be achieved. In order to easily carry out the cornering, a tire for the motorcycle includes a tread having a small radius of curvature. In straight running, a center region of the tread comes in contact with a ground. On the other hand, in the cornering, a shoulder region comes in contact with the ground. A tire considering respective roles of the center region and the shoulder region has been described in Japanese Laid-Open Patent Publication No. 2005-271760, Japanese Laid-Open Patent Publication No. 2007-131112 and Japanese Laid-Open Patent Publication No. 2007-168531.

[Patent Document 1] Japanese Laid-Open Patent Publication No. 2005-271760

[Patent Document 2] Japanese Laid-Open Patent Publication No. 2007-131112

[Patent Document 3] Japanese Laid-Open Patent Publication No. 2007-168531

DISCLOSURE OF THE INVENTION

Problems that the Invention is to Solve

In the straight running of the motorcycle, the center region of the tire mainly comes in contact with the ground. In the cornering, the shoulder region of the tire mainly comes in contact with the ground. In a transition from the straight running to the cornering, a contact surface of a tread of the tire makes a transition from the center region to the shoulder region. In a transition from the cornering to the straight running, moreover, the contact surface of the tread makes a transition from the shoulder region to the center region. Referring to a tire having the center region and the shoulder region which are formed by different materials, a rider is apt to feel uncomfortable in the cornering. The tire lacks a stability in the transition between the straight running and the cornering.

In order to prevent the stability in the transition between the straight running and the cornering from being damaged, it is impossible to cause the materials of the center region and the shoulder region to be greatly different from each other. In a selection of the material of the center region which requires a straight running stability and that of the shoulder region which requires a cornering stability, the stability in the transition imposes restrictions.

It is an object of the present invention to provide a tire for a motorcycle which does not damage a stability in a transition between straight running and cornering but is excellent in various performances.

Means for Solving the Problems

A tire for a motorcycle according to the present invention includes a tread. The tread is divided into (2N−1) parts (N is a natural number which is equal to or greater than four). The tread includes a first region positioned on a center, and second to Nth regions in order from the first region toward a shoulder side. The second to Nth regions make a pair of regions which are symmetrical with respect to an equator plane of the tire. The first to Nth regions are formed by crosslinked rubber compositions respectively and materials of the respective regions are different from each other. A rubber hardness of the region on the center side is equal to or higher than a rubber hardness of the region on the adjacent shoulder side from the first region to the Nth region. A rubber hardness of the first region is higher than a rubber hardness of the Nth region.

It is preferable that a loss tangent tan δ of the region on the center side should be equal to or smaller than a loss tangent tan δ of the region on the adjacent shoulder side from the first region to the Nth region of the tire. A loss tangent tan δ of the first region is smaller than a loss tangent tan δ of the Nth region.

It is preferable that the tread of the tire should be divided into nine parts or greater.

It is preferable that a difference between the rubber hardness of the first region and the rubber hardness of the Nth region should be equal to or greater than three in the tire in which the tread is divided into (2N−1) parts (N is a natural number which is equal to or greater than four). It is preferable that a difference between the loss tangent tan δ of the first region and the loss tangent tan δ of the Nth region should be equal to or greater than 0.05.

It is preferable that a tread dividing angle of a boundary between the regions obtained by dividing the tread of the tire should be equal to or greater than 15° and be equal to or smaller than 75°.

A method of manufacturing a tire for a motorcycle which has the divided tread includes the steps of winding a carcass ply around an inner liner, winding a belt ply around the carcass ply, winding Nth to first strips forming a tread around the belt ply in order (N is a natural number which is equal to or greater than four), thereby obtaining a green tire, and pressurizing and heating the green tire to obtain a tire. Respective materials from the Nth strip to the first strip are different from each other, a rubber hardness obtained through crosslinking from the strip in a region on a center side is equal to or higher than a rubber hardness obtained through the crosslinking from the strip in a region on an adjacent shoulder side, and a rubber hardness of a first region is set to be higher than a rubber hardness of an Nth region. In the tire, second to Nth regions make a pair of regions which are symmetrical with respect to an equator plane of the tire, and divided treads obtained by a (2N−1) division are provided.

Effect of the Invention

In the tire for a motorcycle, in the transition from the straight running to the cornering, the contact surface of the tread of the tire gradually makes a transition from the center region to the shoulder region. In the tire according to the present invention, the materials of the center region and the shoulder region are different from each other and they are gradually varied from the center region to the shoulder region. The tire relieves a noncomfortableness given to a rider in the cornering. The tire is excellent in a stability in both the transition from the straight running to the cornering and the transition from the cornering to the straight running. In the tire, the noncomfortableness of the rider is relieved. Therefore, the center region and the shoulder region can be constituted by materials which are suitable for respective roles. In the tire, various excellent performances can be achieved. The tire can easily be manufactured by a strip wind method.

EXPLANATION OF DESIGNATIONS

Figure 1:
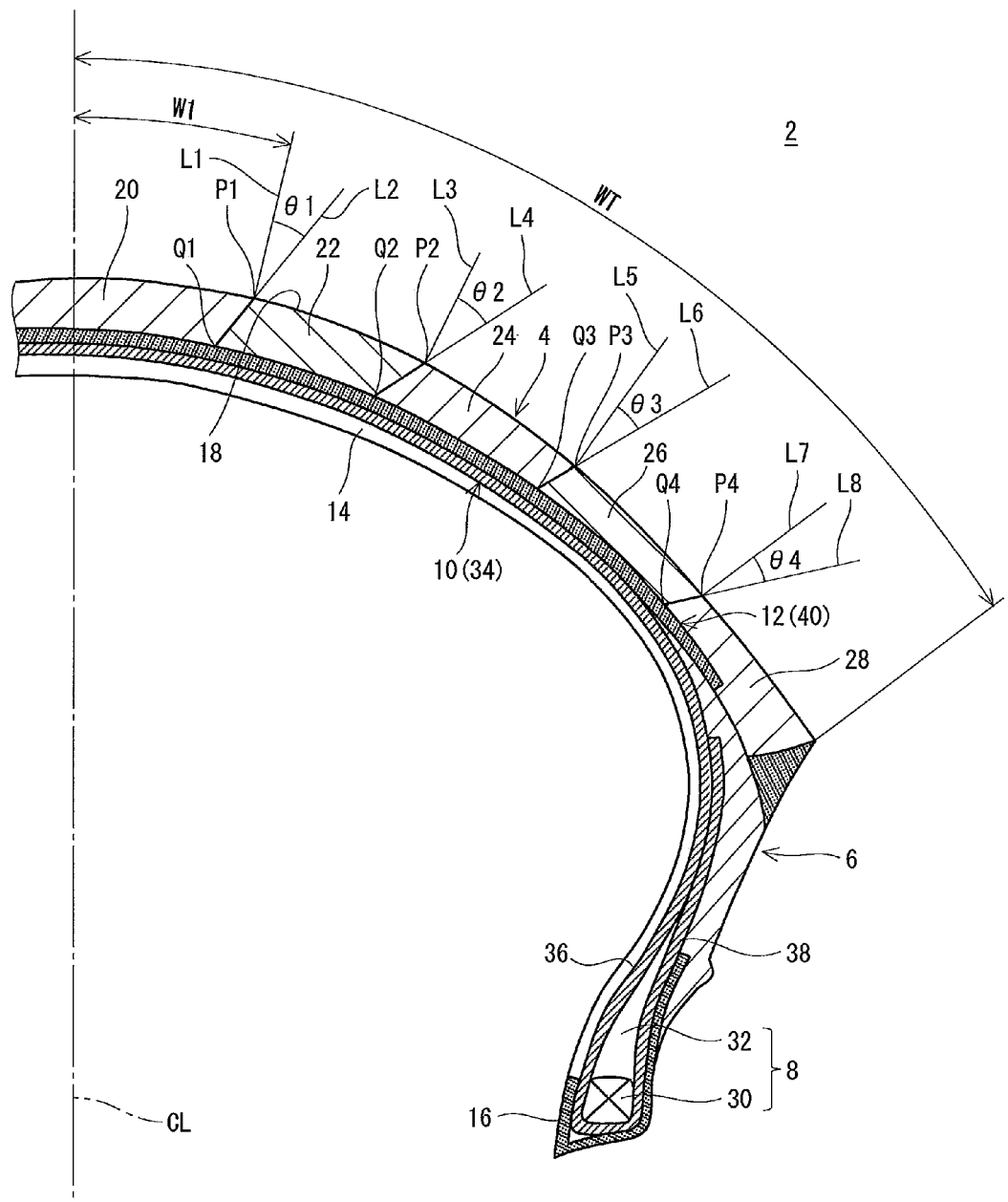
FIG. 1 is a sectional view showing a rear tire according to an embodiment of the present invention.

2 . . . tire
4 . . . tread
6 . . . sidewall
8 . . . bead
10 . . . carcass
12 . . . belt
14 . . . inner liner
16 . . . chafer
18 . . . tread surface
20 . . . first region
22 . . . second region
24 . . . third region
26 . . . fourth region
28 . . . fifth region
30 . . . core
32 . . . apex
34 . . . carcass ply
36 . . . main portion
38 . . . fold-back portion
40 . . . belt ply
42 . . . cord
44 . . . topping rubber
46 . . . inner belt ply
48 . . . outer belt ply
50 . . . ribbon
52 . . . fifth strip
54 . . . fourth strip

BEST MODE FOR CARRYING OUT THE INVENTION

The present invention will be described below in detail based on preferred embodiments with reference to the drawings.

In FIG. 1, a vertical direction indicates a radial direction. A transverse direction in FIG. 1 indicates an axial direction. A tire 2 takes an almost symmetrical shape with respect to a one-dotted chain line CL. The one-dotted chain line CL represents an equator plane. The tire 2 includes a tread 4, a sidewall 6, a bead 8, a carcass 10, a belt 12, an inner liner 14 and a chafer 16. The tire 2 is a pneumatic tire of a tubeless type. The tire 2 is attached to a motorcycle.

The tread 4 takes an outward convex shape in the radial direction. The tread 4 has a tread surface 18 to come in contact with a road surface. The tread 4 is divided into (2N−1) parts (N is a natural number which is equal to or greater than four). In the tread 4 of FIG. 1, the tread surface 18 from the equator plane to a shoulder end is divided almost equally. The tread 4 is divided into a first region 20 positioned on a center region, and a second region 22, a third region 24, a fourth region 26 and a fifth region 28 in order from the center region toward a shoulder region. The second region 22 to the fifth region 28 make a pair of regions which are symmetrical with respect to the equator plane of the tire 2. The first region 20 to the fifth region 28 are formed by crosslinked rubber compositions, respectively. Materials of the respective regions are different from each other.

In FIG. 1, a point P1 denotes a point on which a boundary surface between the first region 20 and the second region 22 crosses the tread surface 18. A point Q1 denotes a point on which the boundary surface between the first region 20 and the second region 22 crosses an inner side surface of the tread 4. A straight line L1 denotes a normal of the tread surface 18 on the point P1. A straight line L2 denotes a straight line passing through the points P1 and Q1.

An angle θ1 denotes an angle formed by the straight lines L1 and L2. The angle θ1 represents a tread dividing angle of the first region 20 and the second region 22. The angle θ1 is shown with clockwise and counterclockwise directions from the straight line L1 set to be positive and negative respectively in FIG. 1. The tire 2 takes a symmetrical shape with respect to the straight line CL. On a section at an opposite side which is not shown in FIG. 1, the angle θ1 is shown with counterclockwise and clockwise directions set to be positive and negative respectively. An interface between the first region 20 and the second region 22 is shown in a straight line on the section of FIG. 1. The interface is not always restricted to the straight line. Even if the interface is not the straight line, the straight line L1 is obtained as a straight line passing through the points P1 and Q1. The angle θ1 formed by the straight lines L1 and L2 represents a tread dividing angle. The straight lines L1 and L2 and the angle θ1 are measured in a sample obtained by cutting the tire 2.

A point P2, a point Q2, a straight line L3, a straight line L4 and an angle θ2 on a boundary between the second region 22 and the third region 24 are determined in the same manner as the point P1, the point Q1, the straight line L1, the straight line L2 and the angle θ1. A point P3, a point Q3, a straight line L5, a straight line L6 and an angle θ3 on a boundary between the third region 24 and the fourth region 26 are also determined in the same manner as the point P1, the point Q1, the straight line L1, the straight line L2 and the angle θ1. A point P4, a point Q4, a straight line L7, a straight line L8 and an angle θ4 on a boundary between the fourth region 26 and the fifth region 28 are also determined in the same manner as the point P1, the point Q1, the straight line L1, the straight line L2 and the angle θ1. The angles θ2, θ3 and θ4 represent tread dividing angles of the respective adjacent regions.

The sidewall 6 is extended almost inward in the radial direction from an end of the tread 4. The sidewall 6 is formed by a crosslinked rubber composition. The sidewall 6 absorbs a shock from a road surface by a flexure. Furthermore, the sidewall 6 prevents an external damage of the carcass 10.

The bead 8 is extended almost inward in the radial direction from the sidewall 6. The bead 8 includes a core 30 and an apex 32 extended outward in the radial direction from the core 30. The apex 32 is tapered outward in the radial direction. The apex 32 is formed by a crosslinked rubber composition. The apex 32 has a high hardness.

The carcass 10 is formed by a carcass ply 34. The carcass ply 34 is extended along internal surfaces of the tread 4 and the sidewall 6. The carcass ply 34 is folded back from an inside toward an outside in the axial direction around the core 30. By the fold-back, a main portion 36 and a fold-back portion 38 are formed in the carcass ply 34. The fold-back portion 38 is superposed on an external surface of the main portion 36.

The carcass ply 34 is constituted by a cord and a topping rubber, which is not shown. An absolute value of an angle formed by the cord with respect to the equator plane CL is 65° to 90°. In other words, the tire 2 has a radial structure. The cord is constituted by an organic fiber. Examples of a preferable organic fiber include a polyester fiber, a nylon fiber, a rayon fiber, a polyethylene naphthalate fiber and an aramid fiber.

The belt 12 is positioned between the carcass 10 and the tread 4. The belt 12 is formed by a belt ply 40. The belt ply 40 is constituted by a cord 42 and a topping rubber 44, which is not shown in FIG. 1. The cord 42 is substantially extended in a circumferential direction and is wound spirally. The belt 12 has a so-called jointless structure. The belt 12 suppresses a kickback and a shimmy. The tire 2 including the belt 12 is excellent in a disturbance absorbing performance.

A material of the cord 42 in the belt 12 having the jointless structure is steel or an organic fiber. Specific examples of the organic fiber include an aramid fiber, a nylon fiber, a polyester fiber, a rayon fiber and a polyethylene naphthalate fiber. It is preferable that the cord 42 should have a great constraint force. It is preferable that the cord 42 should have a high rigidity. From this viewpoint, the steel and the aramid fiber are preferable for the material of the cord 42. In particular, the steel is preferable.

The inner liner 14 is bonded to an inner peripheral surface of the carcass 10. The inner liner 14 is formed by a crosslinked rubber. A rubber having an excellent air insulating property is used for the inner liner 14. The inner liner 14 plays a part in holding an internal pressure of the tire 2.

In straight running, the center region of the tread 4 in the tire 2 mainly comes in contact with a ground. In cornering, the shoulder region of the tread 4 mainly comes in contact with the ground. For the center region, a straight running stability and an abrasion resistance are required. For the shoulder region, a cornering stability and a cornering performance are required. In the tire 2 of FIG. 1, the tread 4 is divided into nine parts. A rubber hardness of the first region 20 of the tread 4 in the tire 2 is equal to or higher than a rubber hardness of the second region 22. A loss tangent tan δ of the first region 20 is equal to or smaller than a loss tangent tan δ of the second region 22. The first region 20 is more excellent in a straight running stability and an abrasion resistance than the second region 22. On the other hand, the second region 22 is more excellent in a cornering stability and a cornering performance than the first region 20.

The rubber hardness of the second region 22 is equal to or higher than a rubber hardness of the third region 24. The loss tangent tan δ of the second region 22 is equal to or smaller than a loss tangent tan δ of the third region 24. The second region 22 is more excellent in the straight running stability and the abrasion resistance than the third region 24. The third region 24 is more excellent in the cornering stability and the cornering performance than the second region 22. Similarly, the rubber hardness of the third region 24 is equal to or higher than a rubber hardness of the fourth region 26. The loss tangent tan δ of the third region 24 is equal to or smaller than a loss tangent tan δ of the fourth region 26. The rubber hardness of the fourth region 26 is equal to or higher than a rubber hardness of the fifth region 28. The loss tangent tan δ of the fourth region 26 is equal to or smaller than a loss tangent tan δ of the fifth region 28. In the tire 2, the rubber hardness of the region on the center side is equal to or higher than the rubber hardness of the region on the adjacent shoulder side. In the tire 2, the loss tangent tan δ of the region on the center side is equal to or smaller than the loss tangent tan δ of the region on the adjacent shoulder side.

In the tire 2, a material is varied for each divided region. A suitable material from the straight running to the cornering is selected in order from the center side toward the shoulder side. The region on the center side is more excellent in the straight running stability and the abrasion resistance than the region on the adjacent shoulder side. The region on the shoulder side is more excellent in the cornering stability and the cornering performance than the region on the adjacent center side. By the structure, a noncomfortableness received by a rider is relieved when a contact surface of the tread surface 18 makes a transition between the center region and the shoulder region. By increasing the number of divisions of the tread 4, the variation in the material for each divided region is reduced. Consequently, it is possible to gradually vary the material from the center side toward the shoulder side. From this viewpoint, the number of the divisions of the tread 4 is set to be equal to or greater than seven. When the number of the divisions of the tread 4 is expressed in (2N−1), the tread 4 is divided with N set to be a natural number of four or more. It is more preferable that the number of the divisions of the tread 4 should be equal to or greater than nine. In other words, when the number of the divisions of the tread 4 is expressed in (2N−1), it is preferable that the tread 4 should be divided with N set to be a natural number of five or more.

On the other hand, in respect of a productivity, it is preferable that the number of the divisions of the tread 4 should be smaller. From this viewpoint, it is preferable that the number of the divisions of the tread 4 should be equal to or smaller than 13. When the number of the divisions of the tread 4 is expressed in (2N−1), it is preferable that the tread 4 should be divided with N set to be a natural number of seven or less.

A double arrow WT in FIG. 1 indicates a width from the equator plane to the end of the shoulder. The width WT is measured along a surface of the tread surface 18. A double arrow W1 indicates a width from the equator plane to an end on the shoulder side in the first region 20. The width W1 is measured along the surface of the tread surface 18. In the tire 2, the rubber hardness of the region on the center side is higher than the rubber hardness of the region on the shoulder side. In the tire 2, the center region having a high hardness mainly comes in contact with the ground in the straight running. The tire 2 is excellent in a straight running stability performance. It is preferable that the first region 20 should be provided in such a manner that the contact surface of the tread surface 18 in the tire 2 in the straight running acts as the first region 20. From this viewpoint, a ratio (W1/WT) of the width W1 of the first region 20 to the width WT of the tread surface 18 is preferably equal to or higher than 0.2 and is more preferably equal to or higher than 0.25.

In the cornering, the shoulder region having a low hardness mainly comes in contact with the ground. In the cornering, the fifth region 28 which is suitable for the cornering comes in contact with the ground. From the first region 20 to the fifth region 28, the material of the rubber is gradually varied into a suitable material for the cornering. By the structure, the ratio (W1/WT) is preferably equal to or lower than 0.35 and is more preferably equal to or lower than 0.3. The shoulder region having a low rubber hardness is excellent in a grip performance. The tire 2 is excellent in the cornering stability. From this viewpoint, a difference between the rubber hardness of the first region 20 and the rubber hardness of the fifth region 28 is preferably equal to or greater than two and is more preferably equal to or greater than three. In respect of a stability in a transition from the straight running to the cornering, the difference in the rubber hardness is preferably equal to or smaller than seven and is more preferably equal to or smaller than six. A motorcycle using the tire 2 for a rear tire is excellent in the straight running stability and the cornering stability.

Even if the difference between the rubber hardness of the first region 20 and the rubber hardness of the fifth region 28 is set to be equal to or greater than two, a step wear of the tread surface 18 is caused with difficulty in the tire 2. In the tire 2, the tread 4 is divided into nine parts and the difference between the rubber hardness of the first region 20 and the rubber hardness of the fifth region 28 has a small limitation. A material attaching importance to an abrasion resistance can be disposed in the first region 20 and a material attaching importance to a grip can be disposed in the fifth region 28.

In respect of the straight running stability, the rubber hardness of the first region 20 is preferably equal to or higher than 63 and is more preferably equal to or higher than 65. It is preferable that the rubber hardness of the first region 20 should be equal to or lower than 85. In respect of a grip performance, the rubber hardness of the fifth region 28 is preferably equal to or lower than 80 and is more preferably equal to or lower than 75. It is preferable that the rubber hardness of the fifth region 28 should be equal to or higher than 60.

In the tire 2, the loss tangent tan δ of the center region is smaller than the loss tangent tan δ of the shoulder region. In the tire 2, the shoulder region having the great loss tangent tan δ mainly comes in contact with the ground in the cornering. A contact surface having the great loss tangent tan δ is excellent in the grip performance. The tire 2 is excellent in the cornering performance. In the straight running, the center region having the small loss tangent tan δ mainly comes in contact with the ground. An energy loss is small over a contact surface having the small loss tangent tan δ. A fuel consumption in the straight running can be enhanced.

From this viewpoint, it is preferable that a difference between the loss tangent tan δ of the first region 20 and the loss tangent tan δ of the fifth region 28 should be equal to or greater than 0.05. The difference between the loss tangent tan δ of the first region 20 and the loss tangent tan δ of the fifth region 28 is more preferably equal to or greater than 0.07 and is particularly preferably equal to or greater than 0.09. In respect of the stability in the transition from the straight running to the cornering, the difference in the loss tangent tan δ is preferably equal to or smaller than 0.20 and is more preferably equal to or smaller than 0.15. In the tire 2, the tread 4 is divided into nine parts and the difference between the loss tangent tan δ of the first region 20 and the loss tangent tan δ of the fifth region 28 has a small limitation. A material attaching importance to the fuel consumption can be disposed in the first region 20. A material attaching importance to the grip can be disposed in the fifth region 28.

The angle θ1 of the tire 2 is equal to or greater than 15° and is equal to or smaller than 75°. In the transition from the straight running to the cornering, the tread 4 receives a shearing force. In the tire 2 having the angle θ1 which is smaller than 0°, the shearing force acts in such a direction that the second region 22 can easily be separated over an interface between the first region 20 and the second region 22. In the tire 2 having the angle θ1 which is equal to or greater than 15°, the first region 20 and the second region 22 are prevented from being separated. In the tire 2, the first region 20 is positioned on an external surface side of the second region 22 over the interface between the first region 20 and the second region 22. In the tire 2, a characteristic thereof is gradually changed in the transition between the straight running and the cornering so that the noncomfortableness of the rider can be relieved. The tire 2 is excellent in the stability in the transition between the straight running and the cornering. In the tire 2, the tread 4 is divided so that the material is gradually varied for each divided region. Consequently, the noncomfortableness of the rider can further be relieved. By relieving the noncomfortableness of the rider, it is possible to cause the materials of the rubbers in the first region 20 and the fifth region 28 to be suitable for the respective roles.

In the tire 2, it is preferable that the angle θ1 should be equal to or greater than 15°. Even if the materials of the first region 20 and the second region 22 are varied, consequently, the noncomfortableness received by the rider is relieved. In the tire 2, the second region 22 is separated with difficulty in the transition between the straight running and the cornering. From these viewpoints, the angle θ1 is more preferably equal to or greater than 30° and is particularly preferably equal to or greater than 40°. It is hard to manufacture the tire 2 having the great angle θ1. From this viewpoint, it is preferable that the angle θ1 should be equal to or smaller than 75°. The angle θ1 is more preferably equal to or smaller than 60° and is particularly preferably equal to or smaller than 50°. In FIG. 1, it is preferable that the angles θ2, θ3 and θ4 should be equal to or greater than 15° for the same reason as the angle θ1. The angles θ2, θ3 and θ4 are more preferably equal to or greater than 30° and are particularly preferably equal to or greater than 40°. It is preferable that the angles θ2, θ3 and θ4 should be equal to or smaller than 75° for the same reason as the angle θ1. The angles θ2, θ3 and θ4 are more preferably equal to or smaller than 60° and are particularly preferably equal to or smaller than 50°.

The tread dividing angle influences the noncomfortableness of the rider more greatly toward the shoulder side of the tread 4. From this viewpoint, it is preferable that the tread dividing angle on the shoulder side should be set to be equal to or greater than the tread dividing angle on the center side. It is preferable that a dividing angle on the most shoulder side should be set to be greater than a dividing angle on the most center side. More specifically, in the tire 2 of FIG. 1, the angle θ4 is set to be equal to or greater than the angle θ3. The angle θ3 is set to be equal to or greater than the angle θ2. The angle θ2 is set to be equal to or greater than the angle θ1. It is preferable that the angle θ4 should be set to be greater than the angle θ1.

The present invention can be applied to various tires 2 in which the materials of the center region and the shoulder region are different from each other. The present invention can be applied to the tire 2 in which the hardness of the center region is higher than the hardness of the shoulder region. The present invention can be applied to the tire 2 in which the loss tangent tan δ of the center region is smaller than the loss tangent tan δ of the shoulder region.

The rubber hardness is measured by pressing a Durometer of a type A against the tire 2 on a condition of 23° C. in accordance with the rules of "JIS-K 6253".

The loss tangent tan δ is measured by a viscoelastic spectrometer ("VA-200" manufactured by SHIMADZU CORPORATION) on the following conditions in accordance with the rules of "JIS-K 6394".

Initial distortion: 10%
Amplitude: ±2%
Frequency: 10 Hz
Deforming mode: tension
Measuring temperature: 70° C.

Figure 2:
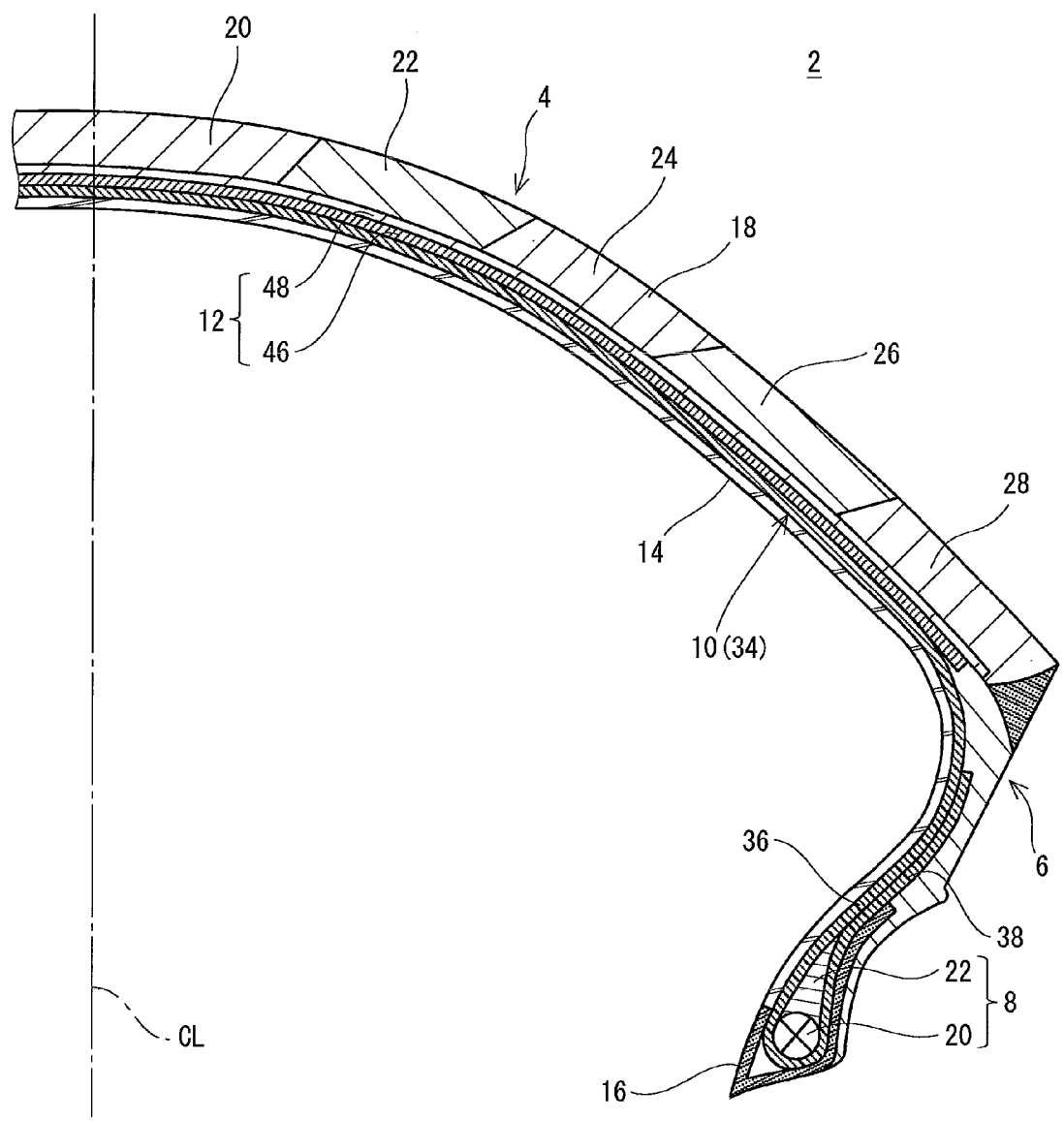
FIG. 2 is a sectional view showing a rear tire according to another embodiment of the present invention.

FIG. 2 is a sectional view showing a tire 2 according to another embodiment of the present invention. A belt 12 of the tire 2 is constituted by an inner belt ply 46 and an outer belt ply 48. The inner belt ply 46 and the outer belt ply 48 are formed by a cord and a topping rubber, which is not shown. The cord is tilted with respect to a circumferential direction. Usually, an absolute value of a tilt angle is equal to or greater than 10° and is equal to or smaller than 35°. An angle of the cord of the inner belt ply 46 with respect to the circumferential direction is reverse to an angle of the cord of the outer belt ply 48 with respect to the circumferential direction. The belt 12 has a so-called cut belt structure. The cord is formed by an aramid fiber or steel. The other structures are the same as those of the tire 2 in FIG. 1 and description thereof will be omitted. The present invention can be executed in the same manner even if the tire has a jointless structure or the cut belt structure.

Figure 3:
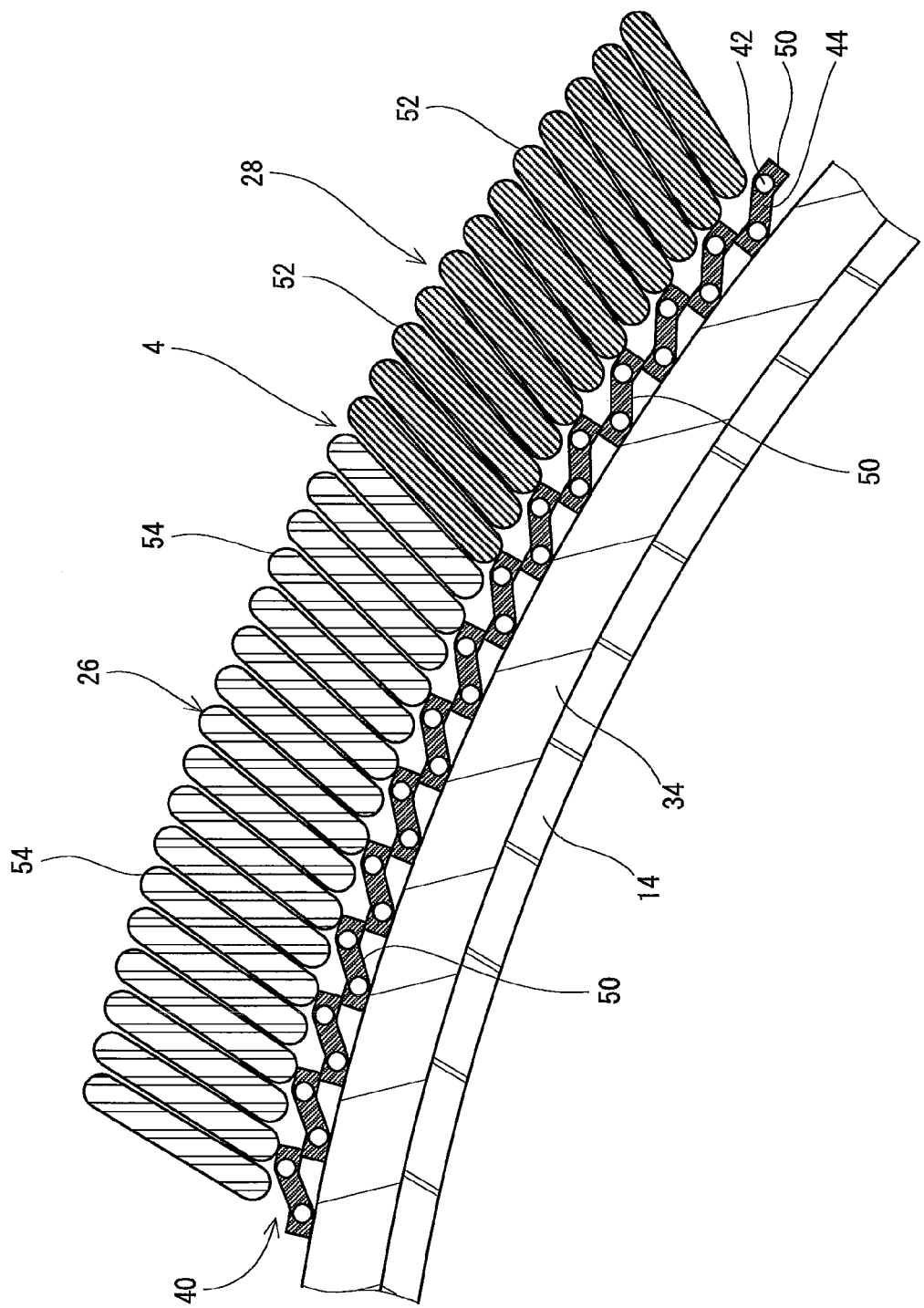
FIG. 3 is a sectional view for explaining a process for manufacturing the tire in FIG. 1.

FIG. 3 is a sectional view for explaining a process for manufacturing the tire 2 in FIG. 1. In the manufacture of the tire 2, the inner liner 14 and the carcass ply 34 are sequentially wound around a former (not shown). A ribbon 50 formed by the cord 42 and the topping rubber 44 is spirally wound around the carcass ply 34 so that the belt ply 40 having the jointless structure is formed. The ribbon 50 is extended substantially in the circumferential direction.

A fifth strip 52 constituted by an uncrosslinked rubber is spirally wound around the belt ply 40 from the shoulder side. The fifth strip 52 is extended substantially in the circumferential direction. The fifth strip 52 is sequentially laminated. When the fifth strip 52 is wound completely, a fourth strip 54 constituted by an uncrosslinked rubber is wound in succession to the fifth strip 52. The fourth strip 54 is extended substantially in the circumferential direction. The fourth strip 54 is sequentially laminated. When the fourth strip 54 is completely wound, a third strip which is not shown is further wound in succession to the fourth strip 54. Similarly, a second strip which is not shown is wound in succession to the third strip. After the fifth to second strips on both sides are wound, a first strip which is not shown is wound around the center in succession to the second strip. Thus, a green tire is obtained. A way of winding the first to fifth strips and order for winding the respective strips can be properly regulated depending on the tread dividing angle.

The green tire is put into a mold and is pressurized and heated. By the heating, a crosslinking reaction is caused over the rubber so that the tire 2 is obtained. The fifth region 28 is obtained from the fifth strip 52. The fourth region 26 is obtained from the fourth strip 54. The third region 24 is obtained from the third strip. The second region 22 is obtained from the second strip. The first region 20 is obtained from the first strip. In the tire 2, five types of strips are used. Therefore, the tread 4 formed by nine divided regions can easily be formed. The tread 4 of the tire 2 can easily be manufactured by a strip wind method.

Although the rear tire has been described in the embodiments shown in FIGS. 1 to 3, the present invention can also be executed for a front tire.

In the present invention, the dimension and the angle in each member of the tire 2 are measured in a state in which the tire 2 is incorporated in a normal rim and is filled with air to obtain a normal internal pressure if there is no particular description. During the measurement, a load is not applied to the tire 2. In this specification, the normal rim implies a rim determined in rules on which the tire 2 depends. A "standard rim" in the JATMA rules, a "Design Rim" in the TRA rules and a "Measuring Rim" in the ETRTO rules are included in the normal rim. In this specification, the normal internal pressure implies an internal pressure determined in the rules on which the tire 2 depends. A "maximum air pressure" in the JATMA rules, a "maximum value" described in "TIRE LOAD LIMITS AT VARIOUS COLD INFLATION PRESSURES" in the TRA rules and an "INFLATION PRESSURE" in the ETRTO rules are included in the normal internal pressure.

EXAMPLES

Although the effect of the present invention will be apparent from examples, the present invention should not be construed to be restrictive based on the description of the examples.

Examples 1 and 2

There was obtained a rear tire according to an example 1 which has the structure shown in FIG. 1. A tread of the tire is divided into nine parts. In the tire, a center region acts as a first region. A second region, a third region, a fourth region and a fifth region are provided in order from the first region toward both shoulder sides. In the tire, each of the first, second, third, fourth and fifth regions divides a tread surface equally. A rubber hardness and a loss tangent tan θ in each of the regions of the tire are set as shown in Table 1. The rear tire has a size of "180/55ZR17". In an example 2, a rubber material of a tread was set as shown in the Table 1. The others were set to be the same as in the tire according to the example 1.

Comparative Example 1

In a comparative example 1, there is obtained a tire having the same structure as that in the example 1 except that the tire is formed by a single tread. In the comparative example 1, there is obtained a rear tire which is put on the market. A rubber hardness and a loss tangent tan δ are set as shown in the Table 1. Structures other than the Table 1 are the same as in the tire according to the example 1.

Comparative Examples 2 and 3

In comparative examples 2 and 3, there is obtained a tire having a structure in which a tread is divided into three parts. The other structures are the same as in the example 1. In the tire, a center region is set to be a first region and a shoulder region is set to be a second region. In the tire, the first and second regions divide a tread surface almost equally. A rubber hardness and a loss tangent tan δ in each of the divided regions are set as shown in the Table 1.

Comparative Examples 4 and 5

In comparative examples 4 and 5, there is obtained a tire having a structure in which a tread is divided into five parts. The other structures are the same as in the example 1. In the tire, a center region acts as a first region. A second region and a third region are provided in order from the first region toward both shoulder sides. In the tire, each of the first, second and third regions divides a tread surface almost equally. A rubber hardness and a loss tangent tan δ in each of the divided regions are set as shown in the Table 1.

Examples 3 and 4

In examples 3 and 4, there is obtained a tire having a structure in which a tread is divided into seven parts. The other structures are the same as in the example 1. In the tire, a center region acts as a first region. A second region, a third region and a fourth region are provided in order from the first region toward both shoulder sides. In the tire, each of the first, second, third and fourth regions divides a tread surface almost equally. A rubber hardness and a loss tangent tan δ in each of the divided regions are set as shown in the Table 1.

[Evaluation of Cornering Performance]

A trial tire was attached to a rear wheel of a motorcycle which has a displacement of 600 cc and is put on the market. A rim width was set to be 5.5 inches and an internal pressure of air in the tire was set to be 290 kPa. A conventional tire put on the market was exactly used for a tire of a front wheel. The motorcycle was caused to carry out cornering of R40m at a speed of 80 km/h, and a rider was caused to execute a sensuous evaluation. The result is shown in the following Table 1. A greater numeral represents a higher evaluation.

[Stability in Transition]

A body of a motorcycle having a trial tire attached as a rear wheel tire was gradually tilted during running at a speed of 80 km/h and the motorcycle was caused to run with a tilt to a full bank. At this time, a rider was caused to execute a sensuous evaluation. The result is shown in the following Table 1. A greater numeral represents a higher evaluation.

[Evaluation of Abrasion Resistance]

A motorcycle having a trial tire attached as a rear wheel tire was caused to run over a circuit course on a condition of a speed of 200 km/h and a distance of 2000 km. A travel distance for 1 mm of a depth of a groove in a tread after the running was indexed and evaluated. The result of the evaluation for the tire put on the market according to the comparative example 1 was set to be 100 and a relative evaluation was thus executed. The result is shown in the following Table 1.

[Table 1]

TABLE 1

| | | Result of Evaluation | | | | | | | | | |
|---|---|---|---|---|---|---|---|---|---|---|---|
| | | Compara. example 1 | | Compara. example 2 | | Compara. example 3 | | Compara. example 4 | | Compara. example 5 | |
| Tread | Number of divisions | 0 | | 3 | | 3 | | 5 | | 5 | |
| | Physical property of rubber | Hardness | Tan δ | Hardness | Tan δ | Hardness | Tan δ | Hardness | Tan δ | Hardness | Tan δ |
| | First region | 63 | 0.27 | 63 | 0.27 | 63 | 0.27 | 63 | 0.27 | 63 | 0.27 |
| | Second region | — | — | 60 | 0.32 | 62 | 0.29 | 62 | 0.29 | 62 | 0.29 |
| | Third region | — | — | — | — | — | — | 60 | 0.32 | 61 | 0.31 |
| | Fourth region | — | — | — | — | — | — | — | — | — | — |
| | Fifth region | — | — | — | — | — | — | — | — | — | — |
| Concerning performance | | 3.5 | | 4.0 | | 3.6 | | 3.7 | | 3.6 | |
| Stability in transition | | 4.0 | | 3.0 | | 3.5 | | 3.6 | | 3.6 | |
| Abrasion resistance | | 100 | | 100 | | 100 | | 100 | | 100 | |
| | | Example 1 | | Example 2 | | Example 3 | | Example 4 | | | |
| Tread | Number of divisions | 9 | | 9 | | 7 | | 7 | | | |
| | Physical property of rubber | Hardness | Tan δ | Hardness | Tan δ | Hardness | Tan δ | Hardness | Tan δ | | |
| | First region | 63 | 0.27 | 63 | 0.27 | 63 | 0.27 | 63 | 0.27 | | |
| | Second region | 62 | 0.29 | 62 | 0.29 | 62 | 0.29 | 62 | 0.29 | | |
| | Third region | 62 | 0.30 | 62 | 0.30 | 61 | 0.31 | 61 | 0.31 | | |
| | Fourth region | 61 | 0.31 | 61 | 0.31 | 60 | 0.32 | 61 | 0.32 | | |
| | Fifth region | 60 | 0.32 | 61 | 0.32 | — | — | — | — | | |
| Concerning performance | | 3.9 | | 3.7 | | 3.8 | | 3.7 | | | |
| Stability in transition | | 4.0 | | 3.8 | | 3.8 | | 3.7 | | | |
| Abrasion resistance | | 100 | | 100 | | 100 | | 100 | | | |

As shown in the Table 1, the examples are excellent in the stability in a transition from straight running to cornering. In the examples, the cornering performance and the stability in a transition are well-balanced and excellent. From the result of the evaluation, advantages of the present invention are apparent.

INDUSTRIAL APPLICABILITY

A tire according to the present invention can be attached to various motorcycles.

The invention claimed is:

1. A tire for a motorcycle, said tire comprising a tread having a tread surface that comes into contact with a road surface and a sidewall extending inward in a radial direction from an end of the tread;
wherein the tread is divided into (2N−1) parts, wherein N is a natural number which is equal to or greater than four, and the tread includes a first region positioned at a tread center, and second to Nth regions positioned in order from the first region toward each shoulder side,
wherein
the first region has a shape that is symmetrical with respect to the tire equatorial plane, the second to Nth regions comprise a pair of tread portions which are symmetrical with respect to the tire equatorial plane, tread dividing angles of each boundary between the regions are obtained by dividing the tread, all of the tread dividing angles are equal to or greater than 15° and are equal to or smaller than 75°, a tread dividing angle on the shoulder side is set to be equal to or greater than a tread dividing angle on the center side, and a tread dividing angle on the shouldermost side is set to be greater than a tread dividing angle on the centermost side,
wherein
the first to Nth regions are formed by crosslinked rubber compositions with each respective region being formed from a rubber composition different from other regions, the center region has a rubber hardness equal to or higher than the rubber hardness of the region on an adjacent shoulder side from the first region to the Nth region, and the first region has a higher rubber hardness than the rubber hardness of the Nth region, such that the rubber hardness of the tread surface gradually transitions from the center region to the shoulder regions;

wherein an end in an axial direction of the tread surface is positioned inward in the radial direction from an outer end in the radial direction of the sidewall and is positioned outward in the axial directed from an outer end in the axial direction of the sidewall; and wherein, in a straight running of the motorcycle, the center region of the tread mainly comes into contact with the ground, in a cornering running of the motorcycle, the shoulder region of the tread mainly comes into contact with the ground, and a contact surface of the tread surface makes a transition between the center region and the shoulder region.

2. The tire according to claim 1, wherein the center region has a loss tangent tan δ that is equal to or smaller than a loss tangent tan δ of the region on an adjacent shoulder side from the first region to the Nth region, and the first region has a loss tangent tan δ that is smaller than a loss tangent tan δ of the Nth region.

3. The tire according to claim 1 or 2, wherein N is a natural number which is equal to or greater than five.

4. The tire according to claim 1, wherein a difference between the rubber hardness of the first region and the rubber hardness of the Nth region is equal to or greater than three.

5. The tire according to claim 2, wherein a difference between the loss tangent tan δ of the first region and the loss tangent tan δ of the Nth region is equal to or greater than 0.05.

6. A tire according to claim 1, wherein a ratio (W1/WT) of a width W1 of the first region, which extends from the equatorial plane to an end on the shoulder side of the first region, to a width WT of the tread, which extends from the equatorial plane to the end of the shoulder, is equal to or higher than 0.2 and is equal to or lower than 0.35.

7. A method of manufacturing a tire for a motorcycle, said tire comprising a tread having a tread surface that comes into contact with a road surface and a sidewall extending inward in a radial direction from an end of the tread, said method comprising the steps of:

winding a carcass ply around an inner liner;

winding a belt ply around the carcass ply;

winding Nth to first strips around the belt ply in order to form a tread that is divided into (2N−1) parts and obtain a green tire, wherein N is a natural number which is equal to or greater than four, and the first strip corresponds to a first region at the tread center having a shape that is symmetrical with respect to the tire equatorial plane, tread dividing angles of each boundary between the regions being obtained by dividing the tread, and all of the tread dividing angles being equal to or greater than 15° and equal to or smaller than 75°, a tread dividing angle on the shoulder side being set to be equal to or greater than a tread dividing angle on the center side, and a tread dividing angle on the shouldermost side being set to be greater than a tread dividing angle on the centermost side; and pressurizing and heating the green tire to obtain a tire for a motorcycle, wherein each of the Nth and first strips is formed from a different crosslinked rubber composition, the first strip has a rubber hardness based on crosslinking that is equal to or higher than the rubber hardness based on crosslinking of a strip in a region on an adjacent shoulder side, the first strip has a higher rubber hardness than the rubber hardness of an Nth strip, the second to Nth strips correspond to regions that comprise a pair of tire portions which are symmetrical with respect to the tire equatorial plane, such that the rubber hardness of the tread surface gradually transitions from the center region to the shoulder regions, whereby an end in an axial direction of the tread surface is positioned inward in the radial direction from an outer end in the radial direction of the sidewall and is positioned outward in the axial directed from an outer end in the axial direction of the sidewall, and, in a straight running of the motorcycle, the center region of the tread mainly comes into contact with the ground, in a cornering running of the motorcycle, the shoulder region of the tread mainly comes into contact with the ground, and a contact surface of the tread surface makes a transition between the center region and the shoulder region.

8. A method of manufacturing a tire according to claim 7, wherein a ratio (W1/WT) of a width W1 of the first region, which extends from the equatorial plane to an end on the shoulder side of the first region, to a width WT of the tread, which extends from the equatorial plane to the end of the shoulder, is equal to or higher than 0.2 and is equal to or lower than 0.35.

* * * * *